US006808184B2

(12) United States Patent
Ames

(10) Patent No.: US 6,808,184 B2
(45) Date of Patent: Oct. 26, 2004

(54) SHOPPING CART WITH RIGID FRAME AND FLEXIBLE, EXPANDABLE WALLS

(76) Inventor: Marc L. Ames, 14 Estate Rd., Hillsborough, NJ (US) 08844

(*) Notice: Subject to any disclaimer, the term of this patent is extended or adjusted under 35 U.S.C. 154(b) by 34 days.

(21) Appl. No.: 10/188,231

(22) Filed: Jul. 2, 2002

(65) Prior Publication Data

US 2002/0175482 A1 Nov. 28, 2002

Related U.S. Application Data

(63) Continuation-in-part of application No. 09/805,015, filed on Mar. 12, 2001, now Pat. No. 6,446,986.

(51) Int. Cl.[7] ............................................. B62D 39/00
(52) U.S. Cl. ............................ 280/33.997; 280/79.2; 280/47.34
(58) Field of Search .................. 280/33.991, 33.997, 280/79.11, 79.2, 79.3, 47.35, 47.34

(56) References Cited

U.S. PATENT DOCUMENTS

| | | | | | |
|---|---|---|---|---|---|
| 2,020,766 | A | * | 11/1935 | Brown ........................ 280/639 |
| 3,276,786 | A | | 10/1966 | Olander ................... 280/33.997 |
| 3,407,959 | A | * | 10/1968 | Mondineu ........................ 220/6 |
| 4,616,839 | A | * | 10/1986 | Trubiano ............... 280/33.991 |
| 5,199,729 | A | * | 4/1993 | Sievert et al. ........... 280/47.35 |
| 5,265,892 | A | * | 11/1993 | Said ............................ 280/30 |
| 5,487,551 | A | * | 1/1996 | Kennedy .................. 280/47.19 |
| 5,544,904 | A | * | 8/1996 | Maher ...................... 280/47.35 |
| 5,630,602 | A | | 5/1997 | Vanderslice et al. ..... 280/47.17 |
| 5,671,933 | A | | 9/1997 | Tucker ..................... 280/47.19 |
| 5,769,435 | A | * | 6/1998 | Nishida .................. 280/33.991 |
| 5,915,723 | A | * | 6/1999 | Austin ........................ 280/651 |
| 6,019,381 | A | * | 2/2000 | Krawczyk ................ 280/47.18 |
| 6,032,965 | A | * | 3/2000 | Sabounjian .............. 280/47.35 |
| 6,079,777 | A | * | 6/2000 | Simmons et al. ........ 297/217.1 |
| 6,328,329 | B1 | * | 12/2001 | Smith ......................... 280/639 |
| 6,446,986 | B1 | * | 9/2002 | Ames ..................... 280/33.997 |
| 2002/0125663 | A1 | * | 9/2002 | Ames ..................... 280/33.991 |
| 2002/0175482 | A1 | * | 11/2002 | Ames ..................... 280/33.991 |

FOREIGN PATENT DOCUMENTS

| | | | | |
|---|---|---|---|---|
| AU | WO 90/14260 | * | 11/1990 | ............. B26B/3/02 |
| DE | 3614877 A1 | * | 6/1986 | ............. B26B/3/02 |
| JP | 404173557 | | 6/1992 | |

OTHER PUBLICATIONS

John Marko, "Plastics", May 23, 1994, 1 page, polyethylene definition available on the World Wide Web.
matweb.com, "Overview–Low Density Polyethylene (LDPE), Sheet/Profile extrusions", 2 pages.
matweb.com, "Overview–Linear Medium Density Polyethylene (LMDPE), Film", 2 pages.
matweb.com, natural Rubber, Vulcanized, 2 pages.

* cited by examiner

Primary Examiner—Bryan Fischmann
Assistant Examiner—J. Allen Shriver
(74) Attorney, Agent, or Firm—Kenneth P. Glynn, Esq.

(57) ABSTRACT

The present invention is a shopping cart for manually transporting goods from one location to another, it includes a bottom frame with a plurality of wheels connected thereto, a vertical support connected to the bottom frame and extending upwardly therefrom to support a basket. The basket has a rigid bottom, an open top, a front, and a back, and two side walls. Each of the side walls includes at least one top member connected to the front and the back. The side walls, front and back, each establish corners where they connect to one another, and these corners include at least one substantially vertical rigid member. The side walls each include a flexible, elastically expandable member connected to the top member and elsewhere to the basket. The flexible, elastically expandable member may be open mesh or sheet, and may be a partial panel. Optionally the flexible, elastically expandable material may be included in the front of the cart.

16 Claims, 5 Drawing Sheets

SHOPPING CART WITH RIGID FRAME AND FLEXIBLE, EXPANDABLE WALLS

REFERENCE TO RELATED APPLICATIONS

This application is a continuation in part of U.S. patent application Ser. No. 09/805,015, filed on Mar. 12, 2001, now U.S. Pat. No. 6,446,986 and entitled "Shopping Cart with Flexible, Expandable Walls", having the same inventor herein.

BACKGROUND OF THE INVENTION

1. Field of the Invention

The present invention relates to shopping carts, and more particularly to shopping carts with flexible, elastically expandable side wall components, to enable the carts to expand from and contract to its original volume when overloaded by goods placed in and removed from the carts. The present invention carts include rigid frames with vertical and horizontal member to create a basket frame.

2. Information Disclosure Statement

Shopping carts have been known for decades and are typically made of wire and tubular metal, plastic molded or extruded pieces or combinations thereof. They have baskets made of non-flexible, non-elastically expandable materials (plastic, metal, or combination) and basically present a rigid structure with a fixed volume. None have been provided with expandable volume capabilities based on flexible structures which expand and contract.

Laundry carts do not have nestability features as do shopping carts, but offer flexible side walls in the form of flexible canvas or plastic "bags".

The following patents were cited in the prosecution of the related application set forth above:

U.S. Pat. No. 3,276,786 describes a light-weight, easily fabricated, stackable, cart for carrying irregularly shaped bundles comprising:
(a) a rigid base member having passages formed therein to receive a handle member and an axle member;
(b) a handle member formed of a single piece of tubing and having end portions disposed within certain of said base member passages;
(c) an elongated cylindrical axle member extending through certain of said base member passages and interlocking said handle member to said base member without the use of other fastening means;
(d) a wheel rotatably positioned on each end of said axle member outboard of said base member; and
(e) a flexible bundle-retaining body secured to said base member and said handle member, said body having no rigid vertical support other than said handle member and having a spreader fixed to the top of said flexible body, said flexible body being deformable to confirm said irregularly shaped bundles and being deformable to permit stacking of a plurality of said carts, said flexible body being formed from a length of transparent flexible, large diameter tubing and being imprinted with advertising material over a least a portion of its surface.

U.S. Pat. No. 2,020,766 describes a collapsible basket, the combination with a pair of end frames, of extensible side frames connecting said end frames, a handle frame pivoted on one of the end frames, and connections between the handle frame and the side frames to collapse or extend said side frames as the handle frame is swung on its pivots.

U.S. Pat. No. 5,630,602 describes a beach carry-all cart device that is provided with a cloth bag extending upwardly from a base member which rides on a cylindrical wheel. The bag is unsupported except for a sleeve around a handle member which extends vertically to a handle grip into which a vertical slot is cut to receive cloth handles extending from the upper edge of the bag. Vertical zippers are provided along opposite side walls to expose the interior contents which typically are one or more beach chairs and other items.

U.S. Pat. No. 5,671,933 describes a utility cart including an open upper bin or container, with an open lower storage shelf disposed immediately below the upper bin. The is lower shelf floor also serves as a support for the cart when it is placed in a generally vertical rest position. Wheels are provided at the rearward portion of the cart, allowing the cart to be moved on the wheels with essentially the entire weight of the cart being supported by the wheels while in transport, thus precluding any substantial requirement for the user to lift any significant portion of the weight of the cart and/or its contents. The cart may be molded or cast of plastic material as a single, unitary component with the exception of the wheels. The cart is particularly adapted for laundry use, with the upper basket being used to contain clothing and the lower storage shelf being used to contain laundry supplies. However, the cart is also readily adaptable for use in performing other chores and tasks as well.

U.S. Pat. No. 5,769,435 describes a shopping cart that has a basket which includes a cart body which, in turn, includes a wheeled chassis and a basket supporting frame mounted to the wheel chassis. A plurality of discrete panel members, fittable to the basket supporting frame for making up the basket, include a pair of side panel members and a bottom panel member, each of the side panel members including a first wall and a second wall which are integrally made of plastic in such a manner as to have a generally L-shape in plan. The first wall makes up a part of a front wall of the basket, the second wall makes up a part of the front wall thereof, and the bottom panel member makes up a bottom wall thereof.

U.S. Pat. No. 5,915,723 describes a collapsible utility cart including a frame having an upper pivotal component, a lower pivotal component and side components positioned therebetween. The frame has an extended orientation and a collapsed orientation. The frame has wheels disposed in corners thereof. An inner basket is dimensioned for securement within the frame. A locking component is provided to lock the frame in a collapsed orientation. A telescopic handle is pivotally coupled to the is frame.

U.S. Pat. No. 6,032,965 describes a modular stacking storage unit with flexible containers is disclosed. The storage unit includes a rigid outer frame comprising a base section, vertical members rising from each corner of the base section, and a plurality of front and back support members. Each storage container or receptacle has flexible material supported between the front and back support members. The front support member is lower than rear support member to increase access to the storage container when multiple modules are stacked. The container has a wider top and a narrower bottom to taper the container and further improve access to a lower container. The top end of each vertical member of each module is shaped to mate with either the bottom end of the vertical members of another container module, a top member, or a support for a clothes bar. The base section has wheels to increase the mobility of the storage unit.

U.S. Pat. No. 6,079,777 describes a combination chaise lounge and tote cart apparatus formed of a fabric covered base frame having first and second fabric covered extension frames hinged to each end of the base frame. Four foldable wheel assemblies are attached to the base frame so that the wheel assemblies can be moved from an extended position to a forward position and each of the extension frames can be folded over onto the base frame to make a compact chaise lounge and tote cart combination. The wheel assembly can be unfolded to extend the wheels and the first and second extension frames can be opened up to a generally parallel vertical position. A locking bar can be removably connected therebetween to hold the first and second extension frames upright and parallel so that items can be carried on the wheel base and can be laid across the tops of the upright first and second extension frames. A hinged handle is also provided for pulling the cart and one or two fabric sides can be connected between first and second extension frames. A fishing rod holder is connected to the base for holding fishing rods in an upright position. The combination easily converts between a chaise lounge and a tote cart and to a folded position for storage or transportation.

U.S. Pat. No. 6,328,329 describes a collapsible shopping cart fabricated from plastic or metal. The front and rear sides of the shopping cart of the present invention would be connected to a lower frame at pivot points, allowing the sides to fold down against the lower frame as needed. Four wheels would also be attached to this lower frame. One side of the cart would be curved or rounded at its top, serving as the cart's push handle, with a cross member support bar attached between the outer support arms. The other side of the cart would have additional horizontal support arms attached to the pivot points at the top of its outer support arms, with these horizontal support arms having incorporated hooks at their ends that would allow the horizontal supports to be secured to the cross member support bar on the opposite side of the cart, creating the cart's upper support frame. The present invention would also come with a mesh basket having a solid bottom and attached eyelets at each corner, with this basket being secured to incorporated hooks on each side of the cart.

Notwithstanding the prior art, the present invention is neither taught nor rendered obvious thereby.

SUMMARY OF THE INVENTION

Shopping carts have been designed to perform the transport-of foodgoods and other products which may be hard or solid (non-amorphous) and need to both be protected from and protective of their contents. They must support, protect, and at least partially contain goods in a manner much more stringent than a rolling pallet, a laundry cart, or other transporter. They typically include nestability with a hinged backwall, open structure for visibility and air circulation, and require complex maneuverability. Also necessary is ease for removing goods at a checkout counter taking into account the cart size, the use, and the typical checkout counter.

The present invention is directed to shopping carts for manually transporting goods from one location to another, which uniquely provide the user with expandable capacity to receive more goods than a shopping cart of comparable size. The present invention shopping cart includes a bottom frame; a plurality of wheels connected to and located below the bottom frame; a vertical support connected to the bottom frame and extending upwardly therefrom to support a basket. The basket is located above the vertical support and connected thereto. The basket has a rigid bottom, an open top, a back, a front, and two side walls. Each of the side walls include at least one top member connected to the front and the back. The side walls, front, and back each establish corners where they connect to one another, and these corners include at least one substantially vertical rigid member. The side walls each include a flexible, elastically expandable member connected to the top member and connected elsewhere to the basket. In some embodiments, the basket front has a flexible, elastically expandable member.

The flexible, elastically expandable member of each side wall is connected to the front, the back, and the bottom of the basket and to its top member. The top member of the sidewalls may be flexible itself, but is preferably rigid. Likewise, the top members of the front and back may be flexible, but are preferably rigid.

In some embodiments, the side walls further include a rigid wall portion connected to the basket and to the flexible, elastically expandable member, e.g. half of the wall is standard rigid construction, and half is flexible, although completely flexible side walls are preferred. The flexible, elastically expandable member of the side walls, and of the front, where applicable, is a material of elastomeric material, rubber, flexible polymer or mixture, and may be sheet, strip, mesh or otherwise. The elastically expandable feature is one which must be recoverable repeatedly, i.e. repeated by resiliently expanding and contracting.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
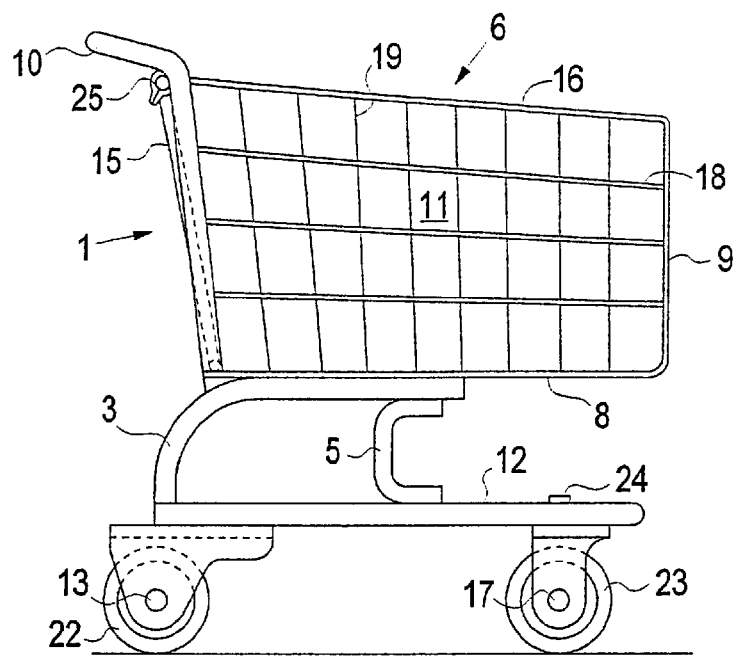
FIGS. 1 and 2 show a side and back view of a prior art shopping cart.
Figure 2:
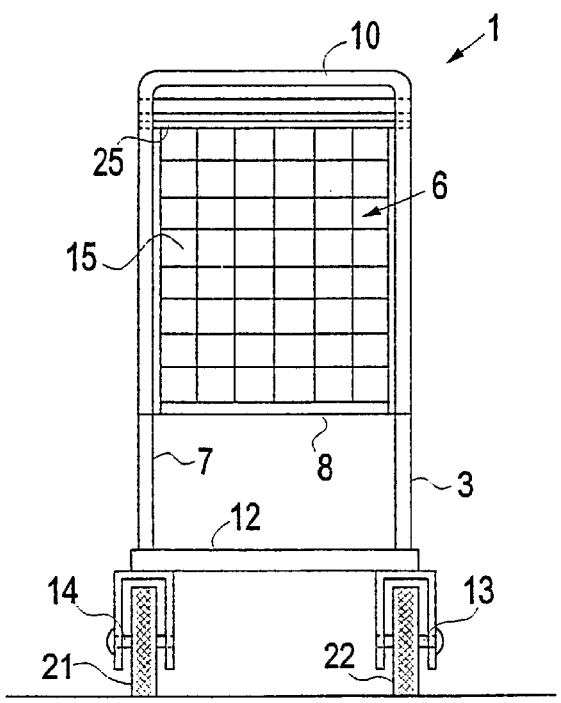

FIGS. 1 and 2 illustrate a side view and a back view, respectively, of a prior art shopping cart 1. Shopping cart 1 includes a bottom frame 12 and a plurality of wheels such as wheels 21, 22, and 23. These wheels are supported by axles such as axles 13, 14, and 17, with front wheels being rotatable in a vertical axis as indicated for example, by rotation member 24.

Shopping cart 1 also has a vertical support, in this case for vertical support components as illustrated by components 3, 5, and 7. These vertical support components are connected to bottom frame 12 and are also connected to basket 6, as shown. Basket 6 has a back 15, a front 9, a bottom 8, and a left and right side wall exemplified by side wall 11. There is a top member 16, vertical wires such as wire 19, and thicker horizontal wires such as wire 18. Back 15 is hinged at its top by hinge rod 25 so that it may swing in to accommodate partial nesting. FIGS. 1 and 2 are stylized representations of a typical shopping cart, but do not show true tapering which would be necessary at the basket and at the bottom frame to permit nesting. The nesting feature itself is not a point of novelty of the present invention, but would be a feature of the present invention shopping carts.

FIGS. 3, 4, 5, and 6 show oblique side views of the framing for various embodiments of the present invention. All of the parts which are identical in FIGS. 3 through 6 are identical and to the extent discussed relative to any one Figure, are applicable to all Figures. In FIGS. 3 through 6 there is a shopping cart of the present invention 51 which does not show the walls, but does illustrate the framing utilized in present invention devices.

Figure 3:
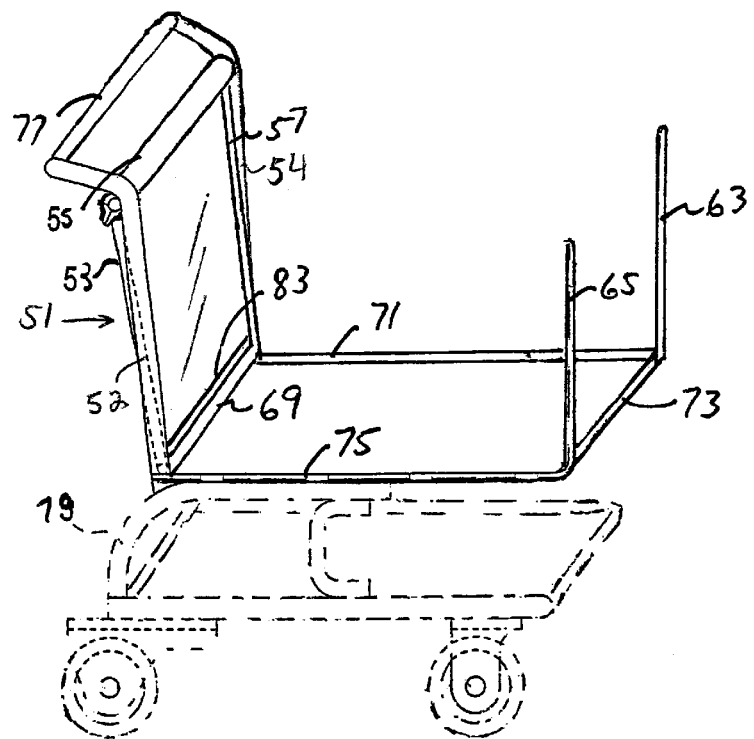
FIGS. 3, 4, 5, and 6 show oblique side views of the framing for various embodiments of the present invention.

FIG. 3 shows a present invention shopping cart 51 with a shopping cart base 79 with an upright support for supporting a basket, and this may be any conventional shopping cart base. Connected to the base (which includes two uprights on each side, but with only one side shown in the Figures) is present invention framework which includes a bottom frame having a rectangular footprint and made of solid members 69, 71, 73 and 75. These may be made of plastic, metal or other rigid material and may be welded, screwed or otherwise connected to one another, or may be cast unistructurally from a single mold. There is a back which includes substantially vertical members 51 and 53 which form a back frame and are connected to top cross member 55 and handle 77. Handle 77 also includes extra support elements 52 and 54, but these are optional. There is a gate or door 83 suspended from top cross member 55 which opens inwardly (toward the front) for nesting of carts into one another. The actual surface of door 83 could be solid, open mesh, perforated or otherwise and could be flexible or partially flexible, if desired. Front upright members 63 and 65 are substantially vertical (e.g. in the range of 70 to 110 degrees from horizontal). In this embodiment shown in FIG. 3, they are connected only at their bottoms at opposite ends of solid member 73. As shown in FIG. 3, the established frame may have rigid or flexible bottom inserts and flexible side walls as well as rigid and flexible front. Any means of attachment may be used, such as heat sealing, heat welding, welding, stitching, slide fit, snaps, rivets or any other attachment means.

Figure 4:
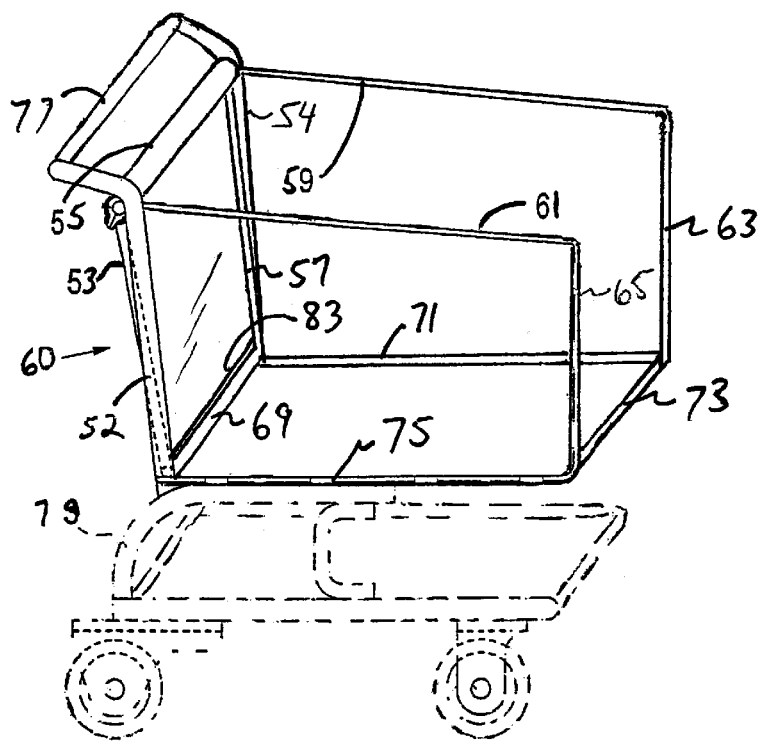

FIG. 4 is identical to FIG. 3 except that present invention shopping cart 60 includes side wall top members 59 and 61, connected as shown, to offer additional structural support to the flexible side walls.

Figure 5:
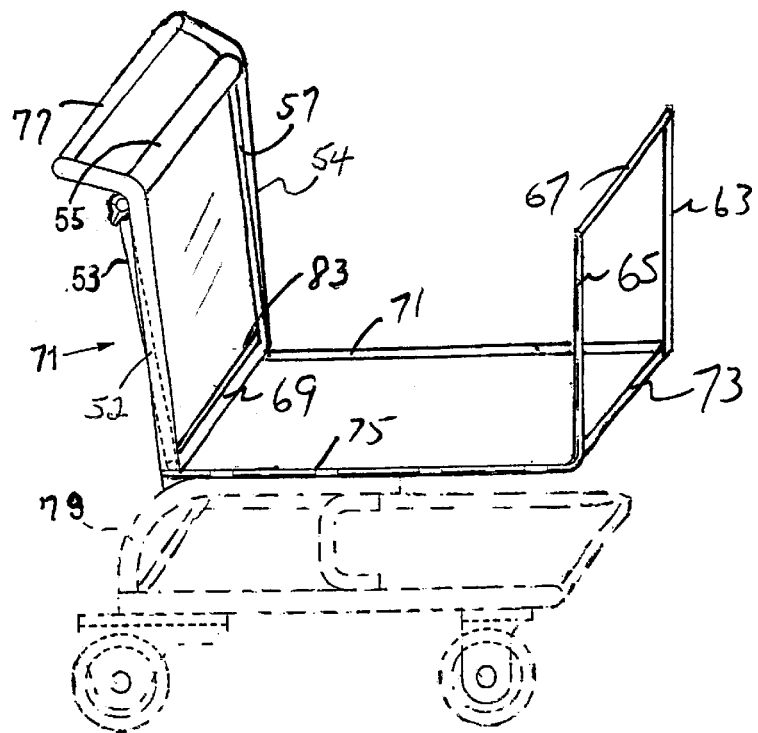

FIG. 5 is the same as FIG. 3 except that present invention shopping cart 71 includes a front top member 67 to enhance the strength of the front corners formed by 63 and 65.

Figure 6:
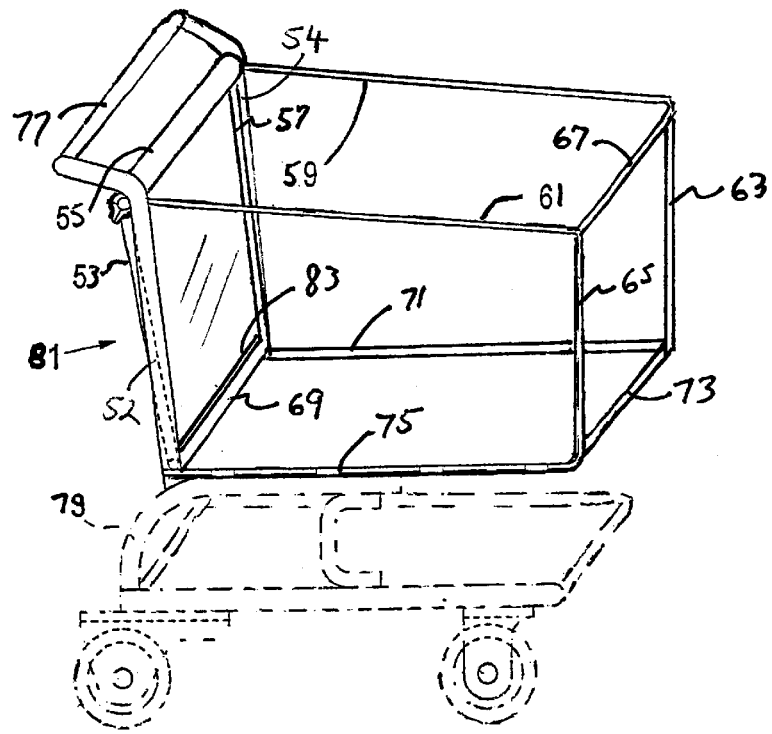

FIG. 6 combines the features of FIGS. 4 and 5 and illustrates present invention shopping cart 81 with a completed rectangle rigid members top with the individual members as shown in FIGS. 5 and 6.

Figure 7:
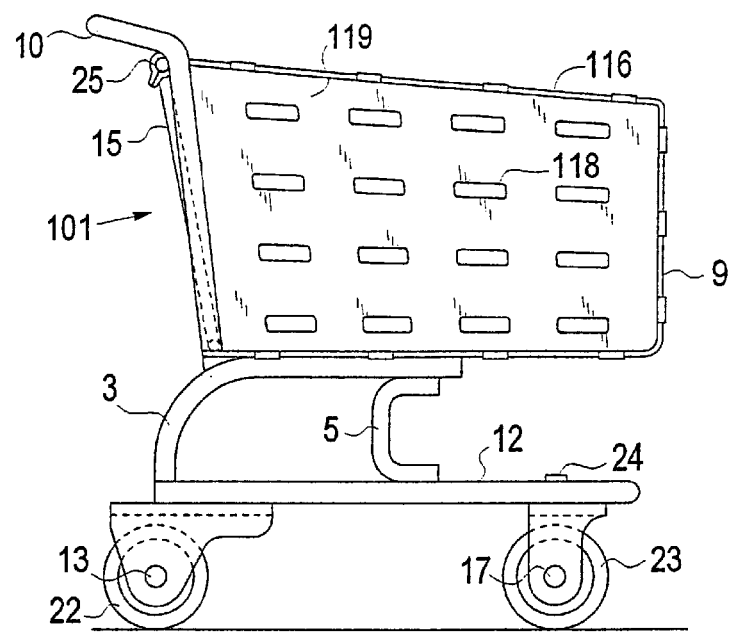
FIG. 7 shows a side view of one present invention shopping cart embodiment with flexible, elastically expandable single component side walls.

FIG. 7 shows a side view of 1 embodiment of the present invention. Here, present invention cart 101 has parts which are shown in FIG. 1 identically numbered and those parts need not be repeated for the discussion of the present invention with respect to FIGS. 7 through 10.

Shopping cart 101 in FIG. 7 has a right side wall 119 (and an identical left side wall, not shown) which is formed of an open mesh flexible, expandable material, such as flexible, expandable rubber or polymer, elastomer or synthetic material, or composite material. These could include inner tube type of rubbers, rubber-synthetic blends, fabric weaves such as in heavy duty elastic bandages, embedded material having parallel, non woven reinforcement threads in a cast or extruded expandable material.

As can be seen in FIG. 7, there are a plurality of "mail slot" cutouts, such as cutout 118, to enhance visibility and elastically expendability.

Figure 8:
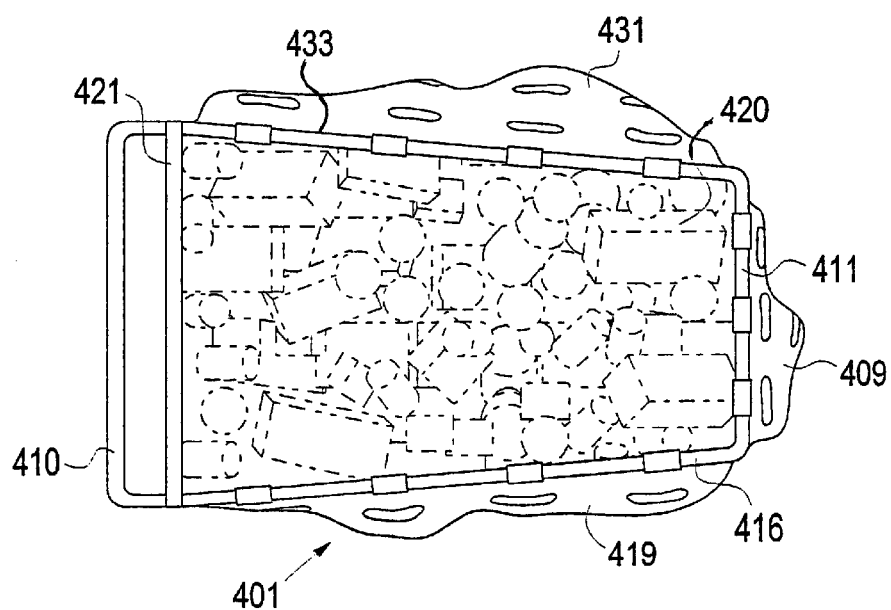
FIG. 8 shows a top view of another embodiment of a present invention shopping cart having flexible, elastically expandable side walls and front, shown with a cart full of goods in an expanded mode.

FIG. 8 shows a top view of another present invention shopping cart 401, in its packed state.

Figure 9:
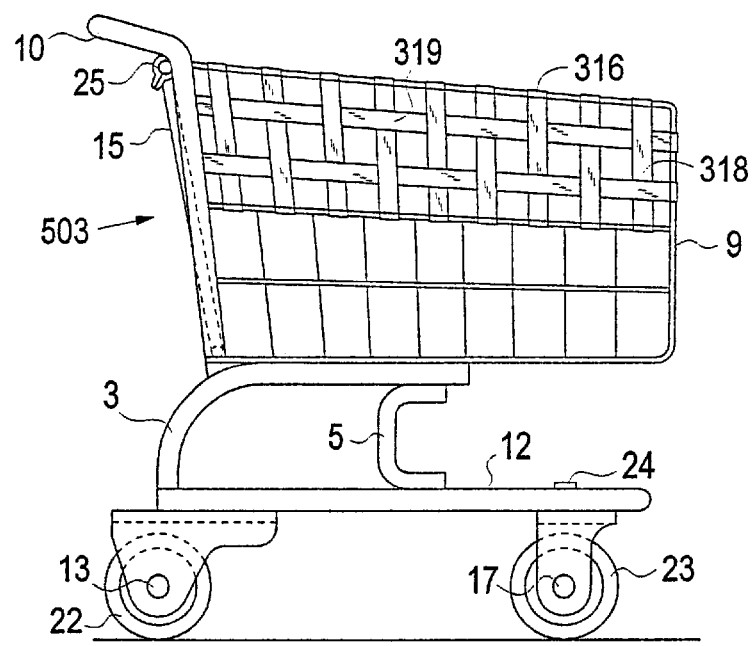
FIG. 9 shows another embodiment of a present invention shopping cart with a partial section of the side walls having expandable material; and, FIG. 10 shows a front view of a present invention shopping cart having a continuous sheet expandable front panel.

Cart 401 is similar to cart 101 of FIG. 7 except that it also has an expandable front 411 which is not part of the FIG. 7 device. Thus cart 401 includes a front 411 and a side top members 416 and 433 and back 421, along with handle 410. There are flexible side walls 419 and 431 and flexible front 409. Groceries 420 have filled cart 401 and pushed side walls 419 and 431 and front 409 to an expanded state. When groceries 420 are removed, side walls 419 and 431 and front 409 will contract to their vertical rest position. FIG. 9 shows another present invention cart 503 with partial height flexible side walls. Cart 503 has an upper half to each side wall which contains interwoven flexible strips such as vertical strip 318 and horizontal strip 319. An identical opposite side wall not shown, is also included. This permits expanded upper portions of the sides of cart 503.

Figure 10:
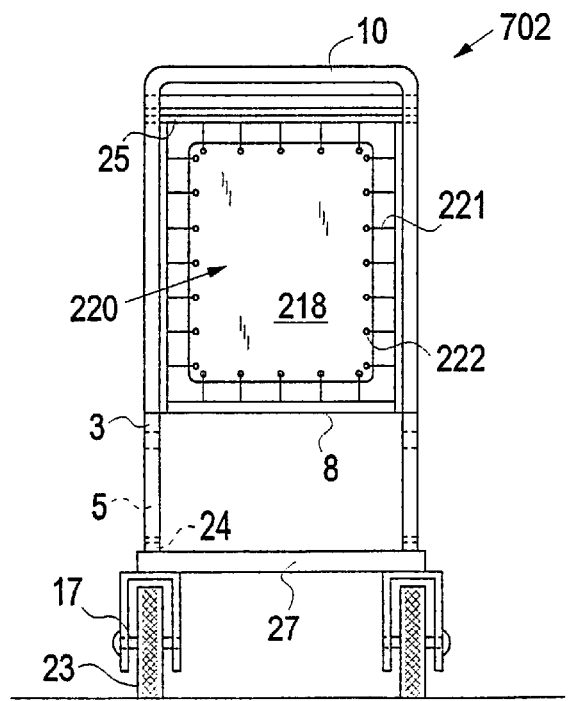

FIG. 10 shows a front view of cart 702 with identical parts to shopping cart 1 of FIG. 1 except that front 220 includes a single solid sheet of expandable material 218 which has hook attachments 222 for hooks such as hook 221. This could be any type of expandable, contractible tear resistant (durable) material and could even be made of spandex-type material.

Obviously, numerous modifications and variations of the present invention are possible in light of the above teachings. It is therefore understood that within the scope of the appended claims, the invention may be practiced otherwise than as specifically described herein.

What is claimed is:

1. A shopping cart for manually transporting goods from one location to another, which comprises:
    a.) a bottom frame;
    b.) a plurality of wheels connected to and located below said bottom frame;
    c.) a vertical support connected to said bottom frame and extending upwardly therefrom to support a basket;
    d.) said basket located above said vertical support and connected thereto, said basket having a bottom, an open top, a front and a back, and two side walls, each of said side walls including at least one top member connected to said front and said back, said at least one top member of each of said side walls selected from the group consisting of rigid top members and flexible top members, said front and said back each establishing corners with said sidewalls, wherein each of said corners include at least one substantially vertical rigid member, and further including a flexible, elastically expandable member being a sheet of elastomeric material and being connected to said at least one substantially vertical member and at least one of said at least one top member, said front or said back of said basket.

2. The shopping cart of claim 1 wherein said flexible, elastically expandable member is connected to said front, said back, and said bottom of said basket.

3. The shopping cart of claim 1 wherein said at least one top member of each of said side walls is a rigid top member.

4. The shopping cart of claim 1 wherein each said front and said back includes a substantially horizontal rigid member connected to two of said substantially vertical rigid members.

5. The shopping cart of claim 4 wherein said back includes a gate suspended from a back rigid top member, said gate adapted to swing inwardly toward said front.

6. The shopping cart of claim 1 wherein said flexible, elastically expandable member is a flexible open mesh.

7. The shopping cart of claim 2 wherein said flexible, elastically expandable member is a flexible, elastically expandable open mesh.

8. The shopping cart of claim 1 wherein said top member of each of said walls is a rigid top member and each of said front and said back includes a substantially horizontal rigid member connected to said top member of each of said walls.

9. A shopping cart for manually transporting goods from one location to another, which comprises:
   a.) a bottom frame;
   b.) a plurality of wheels connected to and located below said bottom frame;
   c.) a vertical support connected to said bottom frame and extending upwardly therefrom to support a basket;
   d.) said basket located above said vertical support and connected thereto, said basket having a rigid bottom, an open top, a front and a back, and two walls, each of said side walls including at least one top member connected to said front and said back, said at least one top member of each of said side walls selected from the group consisting of rigid top members and flexible top members, said front and said back each establishing corners with said sidewalls, wherein each of said corners include at least one substantially vertical rigid member, and further including a flexible, elastically expandable member that is a sheet of elastomeric material that is connected to said at least one substantially vertical rigid member and at least one of said at least one top member, and said back of said basket, and said front of said basket also having a flexible, elastically expandable member that is a sheet of elastomeric material.

10. The shopping cart of claim 9 wherein said flexible, elastically expandable member of each of said side walls is connected to said front, said back, and said bottom of said basket.

11. The shopping cart of claim 9 wherein said at least one top member of each of said side walls is a rigid top member.

12. The shopping cart of claim 9 wherein each of said front and said back includes a substantially horizontal rigid member connected to two of said substantially vertical rigid members.

13. The shopping cart of claim 12 wherein each of said back includes a gate suspended from a back rigid top member, said gate adapted to swing inwardly toward said front.

14. The shopping cart of claim 9 wherein said flexible, elastically expandable member is a flexible, elastically expandable open mesh.

15. The shopping cart of claim 10 wherein said flexible, elastically expandable member is a flexible, elastically expandable open mesh.

16. The shopping cart of claim 9 wherein said top member of each of said walls is a rigid top member and each of said front and said back includes a substantially horizontal rigid member connected to said top member of each of said walls.

* * * * *